US012645807B2

(12) United States Patent (10) Patent No.: US 12,645,807 B2
Wu (45) Date of Patent: Jun. 2, 2026

(54) UNLIMITED REPROVISIONABLE HARDWARE ROOT OF TRUST

(71) Applicant: Cryptography Research, Inc., San Jose, CA (US)

(72) Inventor: Winthrop John Wu, Pleasanton, CA (US)

(73) Assignee: Cryptography Research, Inc., San Jose, CA (US)

( * ) Notice: Subject to any disclaimer, the term of this patent is extended or adjusted under 35 U.S.C. 154(b) by 120 days.

(21) Appl. No.: 18/516,605

(22) Filed: Nov. 21, 2023

(65) Prior Publication Data

US 2024/0176897 A1 May 30, 2024

Related U.S. Application Data

(60) Provisional application No. 63/428,374, filed on Nov. 28, 2022.

(51) Int. Cl.
*G06F 21/60* (2013.01)
*G06F 21/72* (2013.01)
*H04L 9/14* (2006.01)

(52) U.S. Cl.
CPC ............ *G06F 21/602* (2013.01); *G06F 21/72* (2013.01); *H04L 9/14* (2013.01)

(58) Field of Classification Search
CPC ......... G06F 21/602; G06F 21/72; H04L 9/14; H04L 9/0822; H04L 9/0866
See application file for complete search history.

(56) References Cited

U.S. PATENT DOCUMENTS

| | | | |
|---|---|---|---|
| 10,868,669 B2 * | 12/2020 | Liu | H04L 9/0866 |
| 10,877,806 B2 | 12/2020 | Nemiroff et al. | |
| 2010/0281273 A1 * | 11/2010 | Lee | F04B 33/00 |
| | | | 713/193 |
| 2015/0319150 A1 | 11/2015 | Smith et al. | |
| 2017/0126414 A1 * | 5/2017 | Goel | G06F 3/0679 |
| 2017/0177862 A1 * | 6/2017 | Narendra Trivedi | |
| | | | G06F 12/1009 |
| 2020/0195446 A1 * | 6/2020 | Lepoint | H04L 63/0435 |
| 2024/0056316 A1 * | 2/2024 | Best | H04L 9/14 |

* cited by examiner

*Primary Examiner* — Abiy Getachew
(74) *Attorney, Agent, or Firm* — Lowenstein Sandler LLP

(57) ABSTRACT

Technologies for protecting a secure context in a hardware root of trust (ROT) are described. One hardware ROT includes key generation logic and a cryptographic circuit. The key generation logic generates a first key from a value, corresponding to a physical variation of the hardware ROT, and first helper data associated with the physical variation of the hardware ROT. The key generation logic generates a second key from the value and second helper data associated with the physical variation of the hardware ROT. The cryptographic circuit receives a first encrypted secure context from off-chip storage and decrypts the first encrypted secure context using the first key to obtain a secure context. The cryptographic circuit encrypts the secure context using the second key to obtain a second encrypted secure context and stores the second encrypted secure context in the off-chip storage.

20 Claims, 6 Drawing Sheets

100

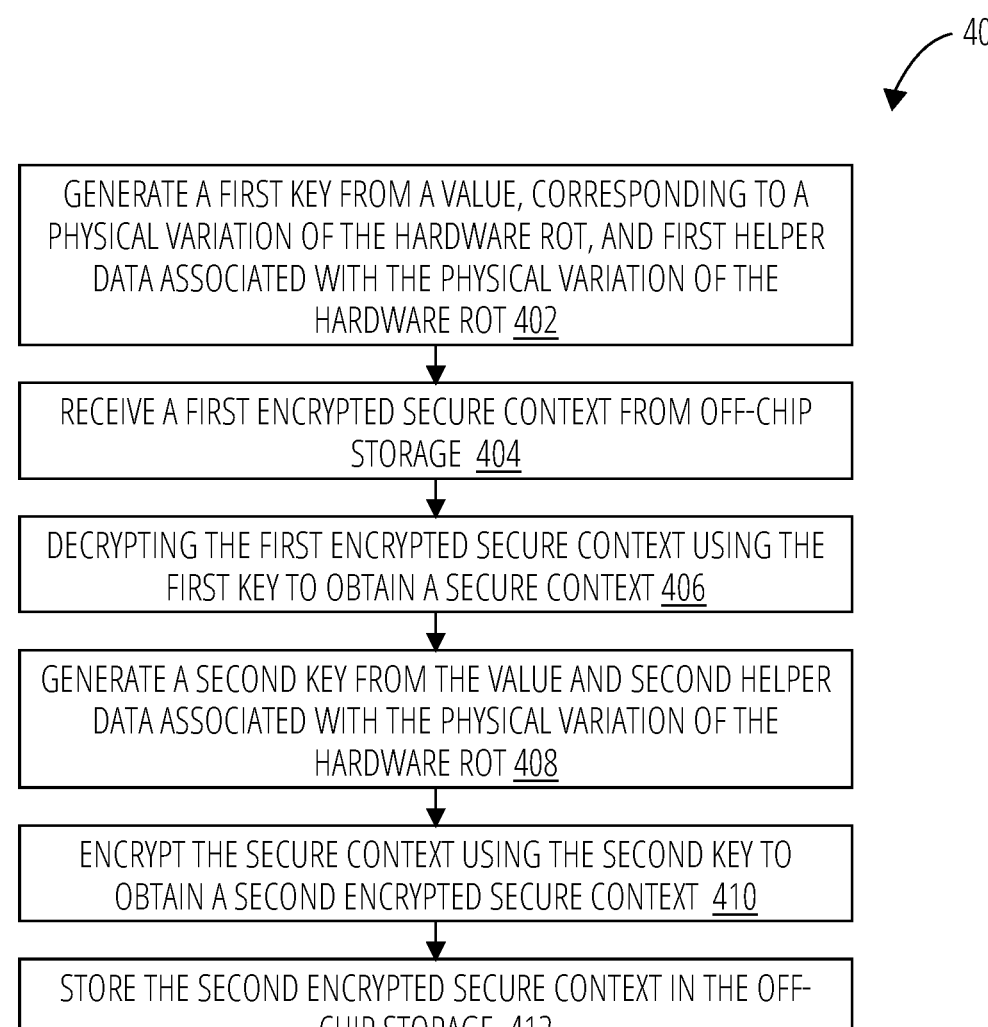

GENERATE A FIRST KEY FROM A VALUE, CORRESPONDING TO A PHYSICAL VARIATION OF THE HARDWARE ROT, AND FIRST HELPER DATA ASSOCIATED WITH THE PHYSICAL VARIATION OF THE HARDWARE ROT 402

RECEIVE A FIRST ENCRYPTED SECURE CONTEXT FROM OFF-CHIP STORAGE 404

DECRYPTING THE FIRST ENCRYPTED SECURE CONTEXT USING THE FIRST KEY TO OBTAIN A SECURE CONTEXT 406

GENERATE A SECOND KEY FROM THE VALUE AND SECOND HELPER DATA ASSOCIATED WITH THE PHYSICAL VARIATION OF THE HARDWARE ROT 408

ENCRYPT THE SECURE CONTEXT USING THE SECOND KEY TO OBTAIN A SECOND ENCRYPTED SECURE CONTEXT 410

STORE THE SECOND ENCRYPTED SECURE CONTEXT IN THE OFF-CHIP STORAGE 412

FIG. 4

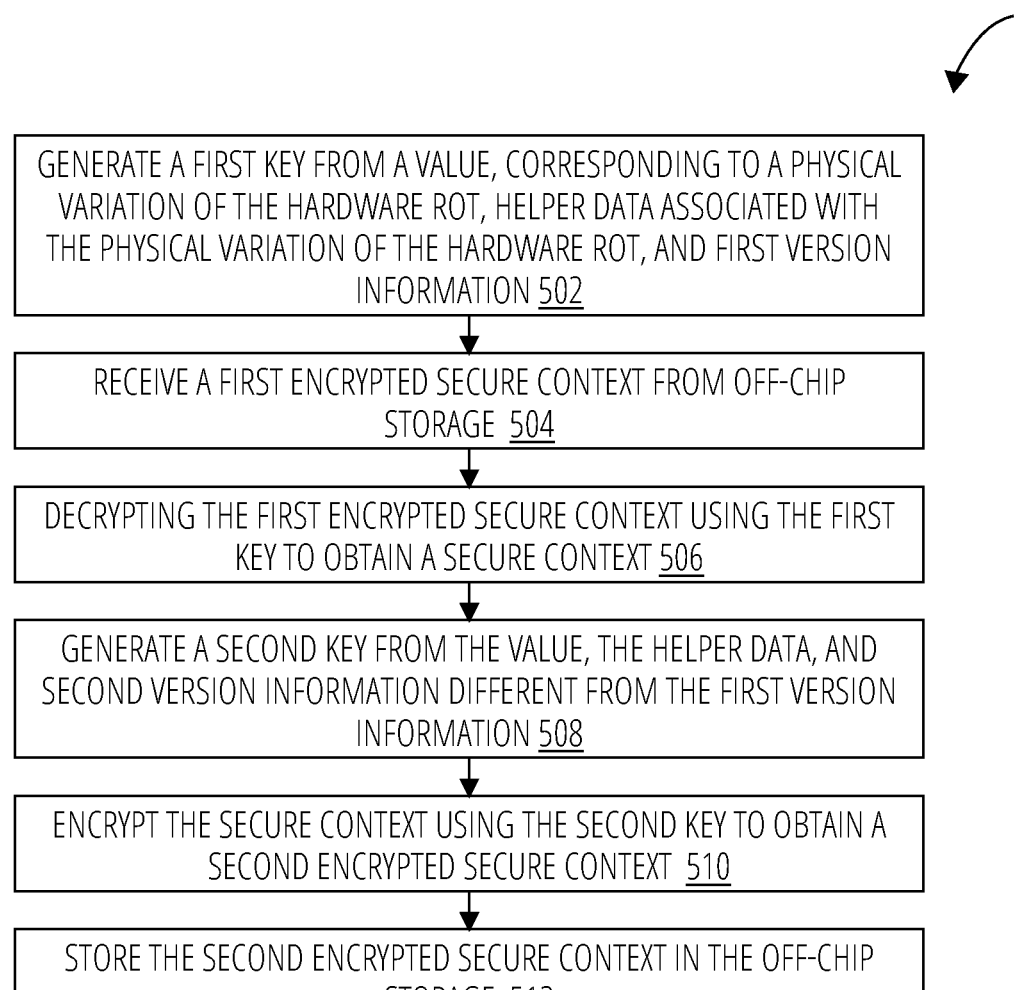

GENERATE A FIRST KEY FROM A VALUE, CORRESPONDING TO A PHYSICAL VARIATION OF THE HARDWARE ROT, HELPER DATA ASSOCIATED WITH THE PHYSICAL VARIATION OF THE HARDWARE ROT, AND FIRST VERSION INFORMATION 502

RECEIVE A FIRST ENCRYPTED SECURE CONTEXT FROM OFF-CHIP STORAGE 504

DECRYPTING THE FIRST ENCRYPTED SECURE CONTEXT USING THE FIRST KEY TO OBTAIN A SECURE CONTEXT 506

GENERATE A SECOND KEY FROM THE VALUE, THE HELPER DATA, AND SECOND VERSION INFORMATION DIFFERENT FROM THE FIRST VERSION INFORMATION 508

ENCRYPT THE SECURE CONTEXT USING THE SECOND KEY TO OBTAIN A SECOND ENCRYPTED SECURE CONTEXT 510

STORE THE SECOND ENCRYPTED SECURE CONTEXT IN THE OFF-CHIP STORAGE 512

FIG. 5

UNLIMITED REPROVISIONABLE HARDWARE ROOT OF TRUST

RELATED APPLICATION

This application claims the benefit of U.S. Provisional Application No. 63/428,374, filed Nov. 28, 2022, the entire contents of which are incorporated by reference.

BACKGROUND

Systems that operate on sensitive data need to protect against unauthorized access to, or disclosure or alteration of, such data by attackers. Attackers who gain access to cryptographic keys and other secrets could steal or tamper with the sensitive data, leading to severe consequences such as subversion of critical operations of the system through the introduction of unauthorized commands and the exposure of confidential or proprietary information. One compromised element may also be used to mount further attacks, endangering other elements of a system. An attacker can monitor a device's external characteristics, such as operation timing, power consumption, and/or electromagnetic radiation, and use this additional information to extract the secret keys being used within the device. External monitoring of a device performing a sequence of cryptographic operations using the same set of keys with different data can result in the leakage of the key. Some external monitoring is considered non-invasive or passive, or semi-invasive (e.g., thermal imaging). In other cases, an attacker can also perform invasive reverse engineering techniques to gain physical access to the circuit to monitor electrical signals.

BRIEF DESCRIPTION OF THE DRAWINGS

The present disclosure is illustrated by way of example, and not by way of limitation, in the figures of the accompanying drawings.

FIG. 4 is a flow diagram of a method of protecting a secure context in a hardware ROT according to at least one embodiment.

FIG. 5 illustrates a method in accordance with one embodiment.

DETAILED DESCRIPTION

Figure 1:
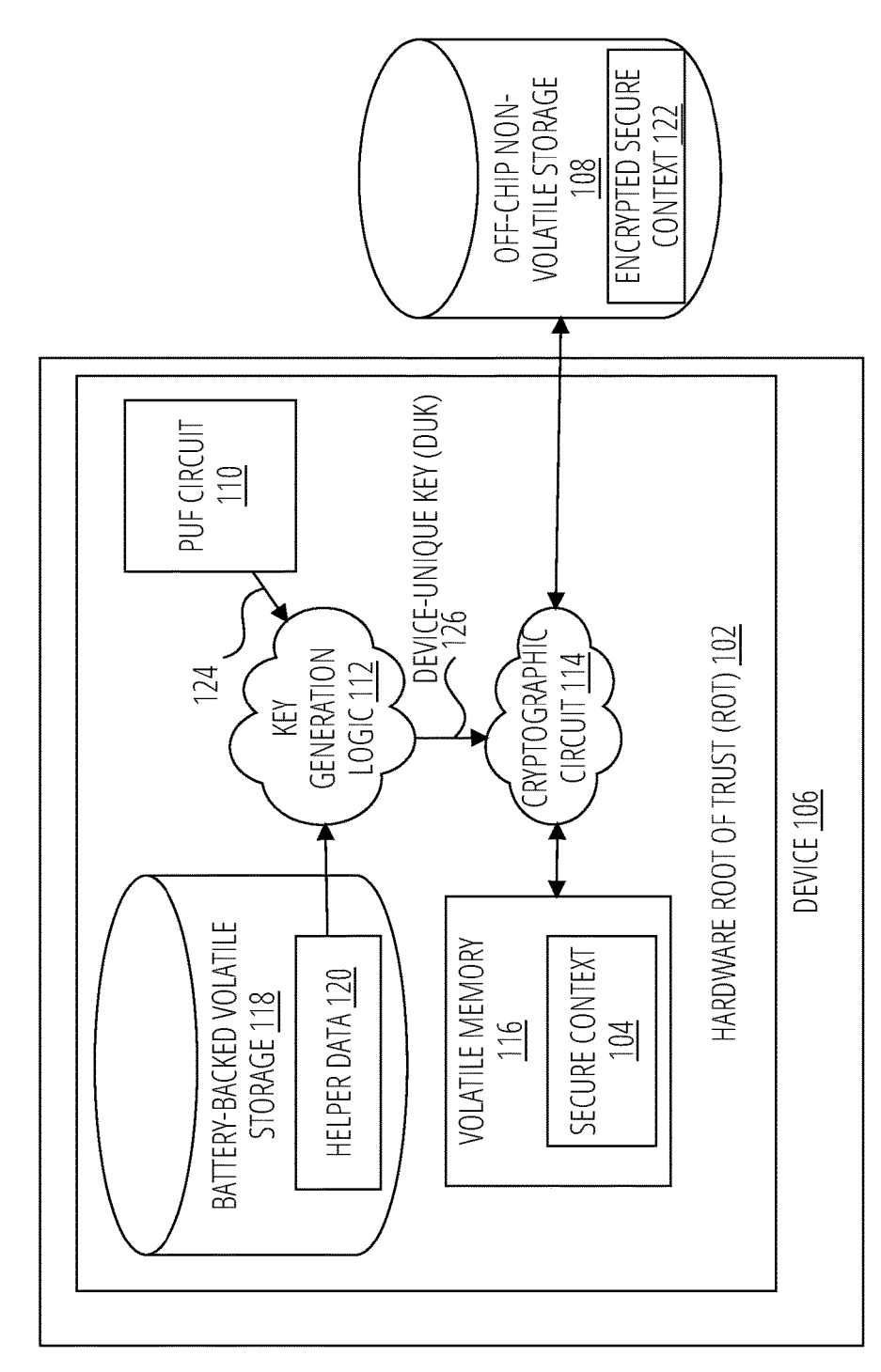
FIG. 1 is a block diagram of a computing system with a hardware ROT for protecting a secure context according to at least one embodiment.

Technologies for protecting a secure context in a hardware root of trust (ROT) are described. The following description sets forth numerous specific details, such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or presented in simple block diagram format to avoid obscuring the present disclosure unnecessarily. Thus, the specific details set forth are merely exemplary. Particular implementations may vary from these exemplary details and still be contemplated to be within the scope of the present disclosure.

In general, a computing device can include a hardware root of trust (ROT) that utilizes a secure context to perform its responsibilities and provide security guarantees. Data in the secure context can include a device stage (e.g., lifecycle, characterization values, or the like), runtime or execution context, secret assets, such as keys, or the like. For proper operation of the hardware ROT, the secure context should be writeable, non-volatile, and secure. The secure context should be updateable, persistent through power cycles or reset events, and protected. Typically, the secure context can be maintained on-chip in readable and writeable non-volatile memory storage or off-chip in readable and writeable non-volatile memory storage. In the on-chip non-volatile memory approach, a hardware ROT typically relies upon some amount of on-chip non-volatile storage in order to maintain its secure context. Reliance upon this resource typically imposes a limitation on the number of provisioning events or context update events that a device can undergo if rollback attacks are a concern. The on-chip non-volatile memory approach can introduce some challenges, such as cost, size, and availability. The contents of the secure context in an on-chip non-volatile memory device are only available within a boundary of the hardware ROT. The off-chip non-volatile memory approach can introduce challenges of long-term confidentiality of secrets. In the off-chip non-volatile memory approach, the contents of the secure context are encrypted using a key in the hardware ROT. The context confidentiality depends upon the security of the key.

Aspects of the present disclosure and embodiments address these problems and others by providing a hardware ROT architecture where the secret key and secure context can be updated and erased without restriction. The hardware ROT architecture can combine aspects of the on-chip and off-chip approaches with a physically unclonable function (PUF) and battery-backed volatile storage to address the problems in each of the on-chip and off-chip approaches. The hardware ROT architecture does not rely on the use of on-chip non-volatile storage to protect or maintain its secure context. By utilizing a PUF and battery-backed volatile storage, the hardware ROT architecture can provide secure context that is protected, such as from rollback attacks, and yet remain completely updateable. The secure context can be encrypted and stored in off-chip non-volatile memory storage (e.g., one or more non-volatile memory devices) to avoid size limitations, updating limitations, and availability limitations. A key for encryption can be generated from a PUF output, helper data, and/or version information. The PUF output can provide secrecy. The helper data may be public or private. The version information can be volatile and immutable. The generated key can be device and version specific. The key can bind a specific encrypted version of the secure context to a device. This can address issues of cloning and rollback attacks. The volatile storage of the version information can allow a complete erasure of the secure context and unlimited provisioning of a device.

It should be noted that data does not need to be helper data, but some value used in the key derivation flow. The data does not need to be secret but must be unmodifiable by an adversary. The same result can be accomplished by storing secure context on-chip battery-backed storage, such as version information. The version information can use a version counter, for example. The context can be recovered by restoring the version counter. The version counter is not necessarily secret.

Aspects of the present disclosure and embodiments can provide long-term storage of the secure context off-chip, and the secure context can be bound to a specific device. The rollback protection can be achieved by changing the PUF-generated key with each context update. The PUF-generated key can be a device-unique key or a device-unique version key, as described herein. The secure context, including the device stage, can be updated without limits, or securely erased. The hardware ROT architecture is not limited by the availability and amount of on-chip non-volatile storage. The complete erasure of the secure context can be accomplished by clearing or overwriting helper data and/or version information in the battery-backed storage.

In at least one embodiment, the hardware ROT includes key generation logic and a cryptographic circuit. The key generation logic can generate a first key from a value, corresponding to a physical variation of the hardware ROT, and first helper data associated with the physical variation of the hardware ROT. The key generation logic can generate a second key from the value and second helper data associated with the physical variation of the hardware ROT. The cryptographic circuit can receive a first encrypted secure context from off-chip storage and decrypt the first encrypted secure context using the first key to obtain a secure context. The cryptographic circuit can encrypt the secure context using the second key to obtain a second encrypted secure context and store the second encrypted secure context in the off-chip storage.

FIG. 1 is a block diagram of a computing system 100 with a hardware ROT 102 for protecting secure context 104 according to at least one embodiment. The computing system 100 includes a device 106 with the hardware ROT 102 and an external non-volatile storage 108 coupled to the device 106. The device 106 can include other circuitry, such as a central processing unit (CPU), or the like. For example, the device 106 can include one or more integrated circuits in which the hardware ROT 102 can be implemented.

The hardware ROT 102 can include a physically unclonable function (PUF) circuit 110, key generation logic 112 (or key generation circuit), cryptographic circuit 114, volatile memory 116, and battery-backed volatile storage 118. As described above, the architecture of the hardware ROT 102 does not rely on the use of on-chip non-volatile storage to protect or maintain its secure context. Rather, the hardware ROT 102 utilizes a PUF and battery-backed volatile storage to protect the secure context from rollback attacks yet remain completely updateable. As an example, the PUF may correspond to physical variation in a static random-access memory (SRAM) where particular bits of the SRAM may be biased towards a value of '0' or a value of '1' at an initialization of a device that includes the SRAM. Helper data can be used to identify which particular biased bits of the SRAM should be selected and used as a value corresponding to the PUF that is used to generate target data (e.g., a device-unique key or a device-unique version key as described herein). The helper data may be generated after the values corresponding to the PUF are selected, and the helper data may be stored in a memory. Subsequently, the helper data may be retrieved from the memory and provided to the PUF at a later time so that the corresponding values of the PUF may be selected to generate the same target data.

As a result, the helper data may be used to select particular bits of a repeatable but random value of the PUF to generate the target data.

In at least one embodiment, the PUF circuit 110 can generate a value 124 (e.g., a fingerprint value) based on the uniqueness of the physical characteristics (e.g., resistance, capacitance, connectivity, etc.) of the hardware ROT 102. For example, the output of the PUF may correspond to an unpredictable or unknown but constant value for a particular semiconductor device. The physical characteristics depend on random physical factors introduced during manufacturing. This causes the chip-to-chip variations in these physical characteristics to be unpredictable and uncontrollable, making it virtually impossible to duplicate, clone, or modify the structure without changing the value 124. In one embodiment, the PUF circuit 110 outputs a fingerprint value that is a seed for a key generation logic 112. The key generation logic 112 can derive a device-unique key 126, e.g., for a cryptographic function, at least in part on the value 124 from the PUF circuit 110. As described below, the key generation logic 112 can use other inputs to generate the device-unique key 126. In at least one embodiment, a PUF with helper data 120, stored in battery-backed volatile storage 118, can be used to produce a key for use with the hardware ROT 102 in the following equation:

$$\text{Device Unique Key(DUK)} = \text{PUF} + \text{Data}^{Vol}_{Helper}$$

In other embodiments, the key can be created from other combinations of the PUF output and helper data. It should be noted that the equation above expresses the parameters as being added. This should not be limited to either exclusive-or (XOR) or addition. In other embodiments, the key generation operation can be any function of these parameters, such as in the following equation:

$$\text{DUK} = \text{func}(\text{Parm}_1, \text{Parm}_2, \ldots)$$

In at least one embodiment, the battery-backed volatile storage 118 can be volatile memory that stores the helper data 120. The volatile memory can be coupled to a battery or other limited power source that allows the contents of the volatile memory to persist through a power cycle event, such as a reset event. The battery-backed volatile storage 118 can be within the hardware ROT 102, as opposed to external non-volatile storage 108 or external volatile memory. If the helper data 120 resides in battery-backed volatile storage 118 and the produced key is device-unique (e.g., device-unique key 126), then the following capabilities can be offered by the hardware ROT 102: i) long-term storage of the secure context 104 can reside off-chip as encrypted secure context 122 in the external non-volatile storage 108 and be bound to the specific device 106; ii) rollback protection can be enabled by changing the PUF-generated key (e.g., 126) with each context update of the secure context 104; iii) the secure context 104, as well as chip state, can be securely erased by clearing or overwriting helper data 120 in the battery-backed volatile storage 118; iv) unlimited provisioning or secure context updates can be performed because the secure context 104 is not limited by the availability and amount of on-chip non-volatile storage.

As described above, the value 124, corresponding to the PUF circuit 110, may be used to generate a device-unique key 126 to be used by the computing system 100. The device-unique key 126 is a secret cryptographic key. Such a cryptographic key may be common among multiple other devices. Since the value corresponding to the different PUFs in different devices may be unknown and unpredictable, additional data (i.e., helper data 118) may be used to facilitate the generation of expected target data when using the value corresponding to the PUF for each of the devices. For example, the helper data 120 may be used to determine which values corresponding to the PUF should be selected and used to generate the device-unique key 126. As a result, the combination of the corresponding helper data 120 and the value 124 corresponding to the PUF may be used to generate the same target data for each of the devices when the value 124 corresponding to the PUF may be different between the devices. The helper data 120 can also be used to consistently retrieve the same value 124 from the PUF circuit 110. In some cases, a PUF challenge can be issued to the PUF circuit 110, and the PUF circuit 110 can return a PUF challenge response to the PUF challenge.

In at least one embodiment, the device 106 can experience a reset event, such as from a power cycle. The key generation logic 112 of the hardware ROT 102 can derive a device-unique key 126 (DUK) after the reset event, as set forth in the equation above. The hardware ROT 102 can retrieve the encrypted secure context 122 from off-chip non-volatile storage (e.g., 108). The cryptographic circuit 114 decrypts the encrypted secure context 122 to obtain the secure context 104 using the device-unique key 126 (DUK) and loads the secure context 104 into on-chip volatile memory 116. The local copy of the secure context 104 can be updated during execution. When the secure context 104 is updated, the key generation logic 112 can derive a new key (DUK') by modifying the helper data 120 in the following equation:

$$DUK'=PUF+Data^{Vol}_{Helper2}$$

The cryptographic circuit 114 can encrypt the secure context 104 (e.g., updated secure context) with the new key (DUK') and store the encrypted secure context 122 in the off-chip non-volatile storage (e.g., 108). In at least one embodiment, no secrets are stored on the device 106 after power-down. The secure context 104 can be re-created using the encrypted secure context 122 with the device-unique key 126, which can be re-generated using the helper data 120 and the value 124 from the PUF circuit 110. In at least one embodiment, the lifecycle and chip context can be stored in the off-chip, long-term non-volatile storage and cryptographically protected in the off-chip non-volatile memory. An invalid off-chip image can be interpreted as a blank or tested state. The context can be loaded at boot, and rollback protection can be achieved by using a new device-unique key with each revision. The path to off-chip non-volatile storage needs to be active after reset or configured by on-chip codes.

In at least one embodiment, the hardware ROT 102 can produce a first key from a PUF in the hardware ROT and first helper data. The hardware ROT 102 can decrypt an encrypted secure context from off-chip storage using the first key. The hardware ROT 102 can produce a second key from the PUF and second helper data. The hardware ROT 102 can encrypt the secure context using the second key. The hardware ROT 102 can store the encrypted secure context in the off-chip storage. In some embodiments, the above operations are performed following a reset event. In other embodiments, the secure context can be updated during execution (after decryption and before re-encrypting. This allows the secure context to be erasable and provides rollback-protected updates.

In at least one embodiment, during operation, the key generation logic 112 generates a first key (e.g., a first instance of device-unique key 126) from the value 124, corresponding to a physical variation of the hardware ROT

102, and first helper data (e.g., first instance of helper data 120) associated with the physical variation of the hardware ROT. In at least one embodiment, the device 106 includes the PUF circuit 110 that outputs the value 124, which corresponds to the physical variation of the device 106. The key generation logic 112 can generate the first key using the output of the PUF (e.g., value 124) and the first helper data (e.g., first instance of the helper data 120). The cryptographic circuit 114 receives a first encrypted secure context (e.g., first instance of encrypted secure context 122) from off-chip storage (e.g., external non-volatile storage 108) and decrypts the first encrypted secure context using the first key to obtain a secure context (e.g., first instance of secure context 104). The secure context 104 can be updated or modified during operation. Once updated or modified, the key generation logic 112 can generate a second key (e.g., second instance of device-unique key 126) from the value 124 and second helper data (e.g., second instance of helper data 120), the second helper data being different than the first helper data. The key generation logic 112 can generate the second key using the output of the PUF (e.g., value 124) and the second helper data (e.g., second instance of the helper data 120). The cryptographic circuit 114 can encrypt the secure context 104 (e.g., updated or modified secure context) using the second key to obtain a second encrypted secure context (e.g., second instance of encrypted secure context 122) and store the second encrypted secure context in the off-chip storage (e.g., external non-volatile storage 108).

In at least one embodiment, the key generation logic 112 can generate a first device-unique key 126 using a PUF challenge response (e.g., 124) and PUF helper data (e.g., 120) and a second device-unique key 126 using the PUF challenge response (e.g., 124) and different PUF helper data (e.g., 120). The PUF helper data can be changed to generate the new device-unique key 126. This may involve re-enrolling the PUF to generate new helper data, which can be an involved and complicated process. In another embodiment, the new key could be accomplished by modifying version information. In at least one embodiment, the key generation logic 112 can generate a first device-unique key 126 using a PUF challenge response (e.g., 124), PUF helper data (e.g., 120), and first version information. The key generation logic 112 can generate a second device-unique key 126 using the PUF challenge response (e.g., 124), the PUF helper data (e.g., 120), and second version information that is different than the first version information, such as illustrated in FIG. 2.

Figure 2:
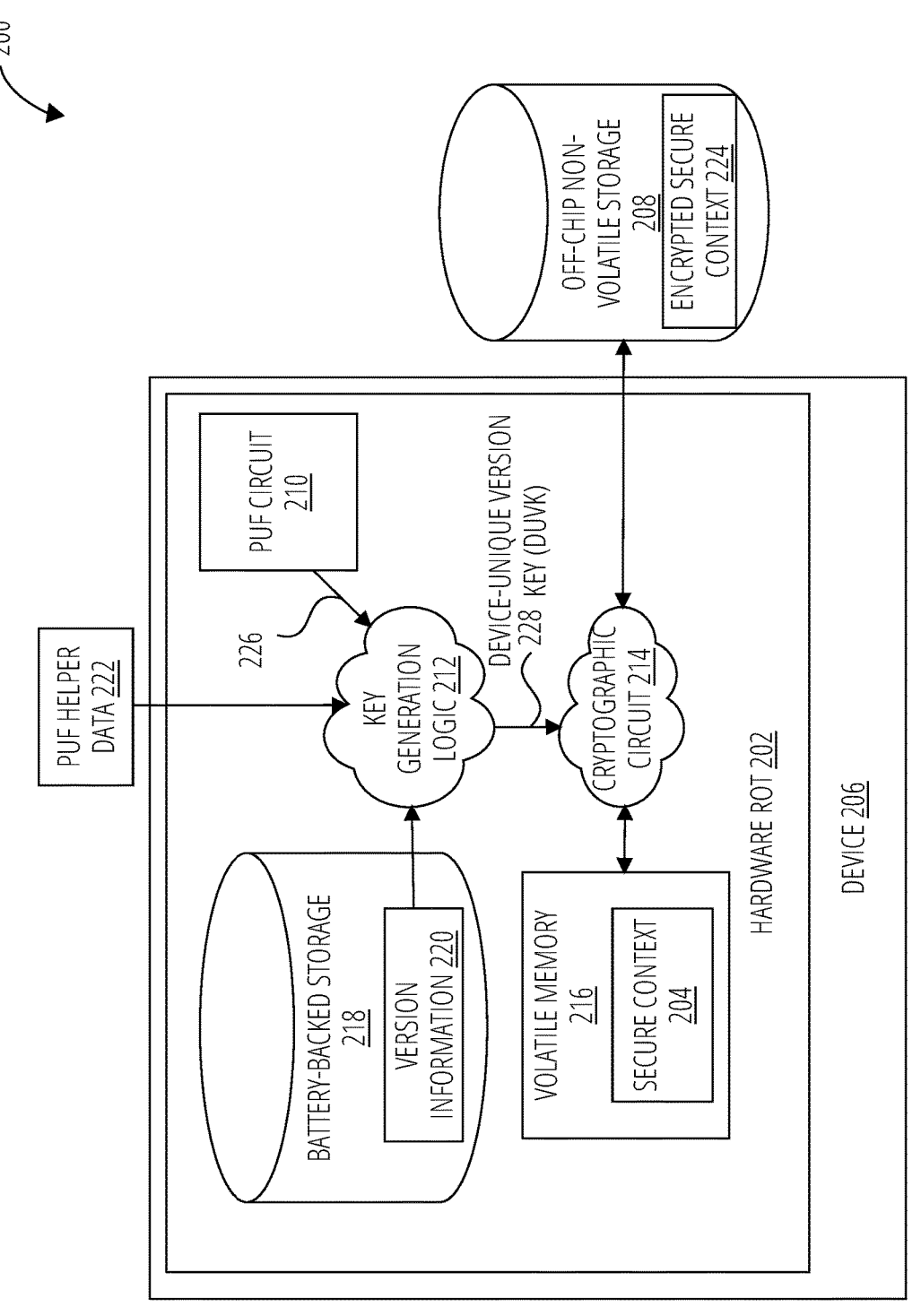
FIG. 2 is a block diagram of a computing system with a hardware ROT for protecting a secure context according to at least one embodiment.

FIG. 2 is a block diagram of a computing system 200 with a hardware ROT 202 for protecting secure context 204 according to at least one embodiment. Like computing system 100, the computing system 200 includes a device 206 with the hardware ROT 202 and an external non-volatile storage 208 coupled to the device 206. The device 206 can include other circuitry, such as a CPU, or the like. The hardware ROT 202 can include a PUF circuit 210, key generation logic 212, cryptographic circuit 214, volatile memory 216, and battery-backed volatile storage 218. In this embodiment, the key generation logic 212 can generate a device-unique version key 228 from three separate components, including a PUF challenge response, PUF helper data, and version information. In at least one embodiment, the PUF circuit 210 can output a value 226 (PUF challenge-response). The key generation logic 212 can receive the value 226, PUF helper data 222, and version information 220, which is stored in the battery-backed storage 218. The PUF helper data 222 can be stored in the battery-backed storage 218 or stored off-chip. The PUF helper data 222 can be public information.

As described herein, generating a new key could be accomplished by either i) changing the helper data or ii) modifying the version information 220, or both. As described above, changing the helper data can require re-enrollment of the PUF to generate the new helper data. So, in at least one embodiment, the same PUF helper data 222 can be used, and the version information 220 can be modified to generate a new key for the secure context 204. If the PUF helper data 222 is stored off-chip, an adversary has ready access and can modify the value to enable rollback attacks. If the PUF helper data 222 is stored securely on-chip, then the ability for an adversary to modify it is lowered but at a potentially higher cost to store the PUF helper data 222. If a small volatile on-chip argument (e.g., version information 220) is incorporated into the key derivation process, it becomes easier and cheaper to generate a new key to address rollback attacks. The device 206 can be re-provisioned by creating a new secure context and generating a new key to protect the secure context. The key can be erased to destroy access to the secure context as a response to tamper events or intrusion events. The version information 220 can be modified to create new keys that bind the secure context to the device 206 and a version of the secure context. The erasure of either the on-chip or off-chip non-volatile memory is slower and more involved than removing the battery power to the battery-backed storage 218.

In at least one embodiment, the device 206 can experience a reset event, such as from a power cycle. In at least embodiment, the key generation logic 212 of the hardware ROT 202 can derive a device-unique version key 228 (DUVK) after the reset event, as set forth in the equation below.

$$\mathrm{DUVK} = \mathrm{PUF} + \mathrm{Data}_{Helper} + \mathrm{Version\_Info}^{Vol}$$

In other embodiments, the key can be created from other combinations of the PUF output and helper data. It should be noted that the equation above expresses the parameters as being added. This should not be limited to either exclusive-or (XOR) or addition. In other embodiments, the key generation operation can be any function of these parameters, such as in the following equation:

$$\mathrm{DUVK} = \mathrm{func}(\mathrm{Parm}_1, \mathrm{Parm}_2, \mathrm{Parm}_3 \ldots)$$

The hardware ROT 202 can retrieve the encrypted secure context 224 from off-chip non-volatile storage (e.g., 208). The cryptographic circuit 214 decrypts the encrypted secure context 224 to obtain the secure context 204 using the device-unique version key 228 (DUVK) and loads the secure context 204 into on-chip volatile memory 216. The local copy of the secure context 204 can be updated during execution. When the secure context 204 is updated, the key generation logic 212 can derive a new key (DUVK') by modifying the version information 220 in the following equation:

$$\mathrm{DUVK}' = \mathrm{PUF} + \mathrm{Data}_{Helper} + \mathrm{Version\_Info}^{Vol}{}_2$$

The cryptographic circuit 214 can encrypt the secure context 204 (e.g., updated secure context) with the new key (DUVK') and store the encrypted secure context 224 in the off-chip non-volatile storage (e.g., 208). In at least one embodiment, no secrets are stored on the device 206 after power-down. The secure context 204 can be re-created using the encrypted secure context 224 with the device-unique version key 228, which can be re-generated using the PUF helper data 222, version information 220, and value 226 from the PUF circuit 210. The version information 220 is second version information that is different from the first version information used to generate the device-unique version key 228.

In at least one embodiment, the hardware ROT 202 can produce a first key from a PUF in the hardware ROT 202, helper data (e.g., 222), and first version information (e.g., 220). The hardware ROT 202 can decrypt an encrypted secure context from off-chip storage using the first key. The hardware ROT 202 can produce a second key from the PUF, the helper data (e.g., 222), and the second version information (e.g., 220). The hardware ROT 202 can encrypt the secure context using the second key. The hardware ROT 202 can store the encrypted secure context in the off-chip storage. In some embodiments, the above operations are performed following a reset event. In other embodiments, the secure context can be updated during execution (after decryption and before re-encrypting. This allows the secure context to be erasable and provides rollback-protected updates.

In at least one embodiment, during operation, the key generation logic 212 generates a first key (e.g., a first instance of device-unique version key 228) from the value 226, corresponding to a physical variation of the hardware ROT 202, and helper data associated with the physical variation of the hardware ROT, and first version information (e.g., a first instance of the version information 222). In at least one embodiment, the device 206 includes the PUF circuit 210 that outputs the value 226, which corresponds to the physical variation of the device 206. The key generation logic 212 can generate the first key using the output of the PUF (e.g., value 226), the helper data (e.g., first instance of the PUF helper data 222), and the first version information (e.g., first instance of the version information 220). The cryptographic circuit 214 receives a first encrypted secure context (e.g., first instance of encrypted secure context 224) from off-chip storage (e.g., external non-volatile storage 208) and decrypts the first encrypted secure context using the first key to obtain a secure context (e.g., first instance of secure context 204). The secure context 204 can be updated or modified during operation. Once updated or modified, the key generation logic 212 can generate a second key (e.g., second instance of device-unique version key 228) from the value 226, the helper data (e.g., same PUF helper data 222), and the second version information (e.g., second instance of the version information 220) being different than the first version information. The key generation logic 212 can generate the second key using the output of the PUF (e.g., value 226), the helper data, and the second version information (e.g., second instance of the version information 220). The cryptographic circuit 214 can encrypt the secure context 204 (e.g., updated or modified secure context) using the second key to obtain a second encrypted secure context (e.g., second instance of encrypted secure context 224) and store the second encrypted secure context in the off-chip storage (e.g., external non-volatile storage 208).

Figure 3:
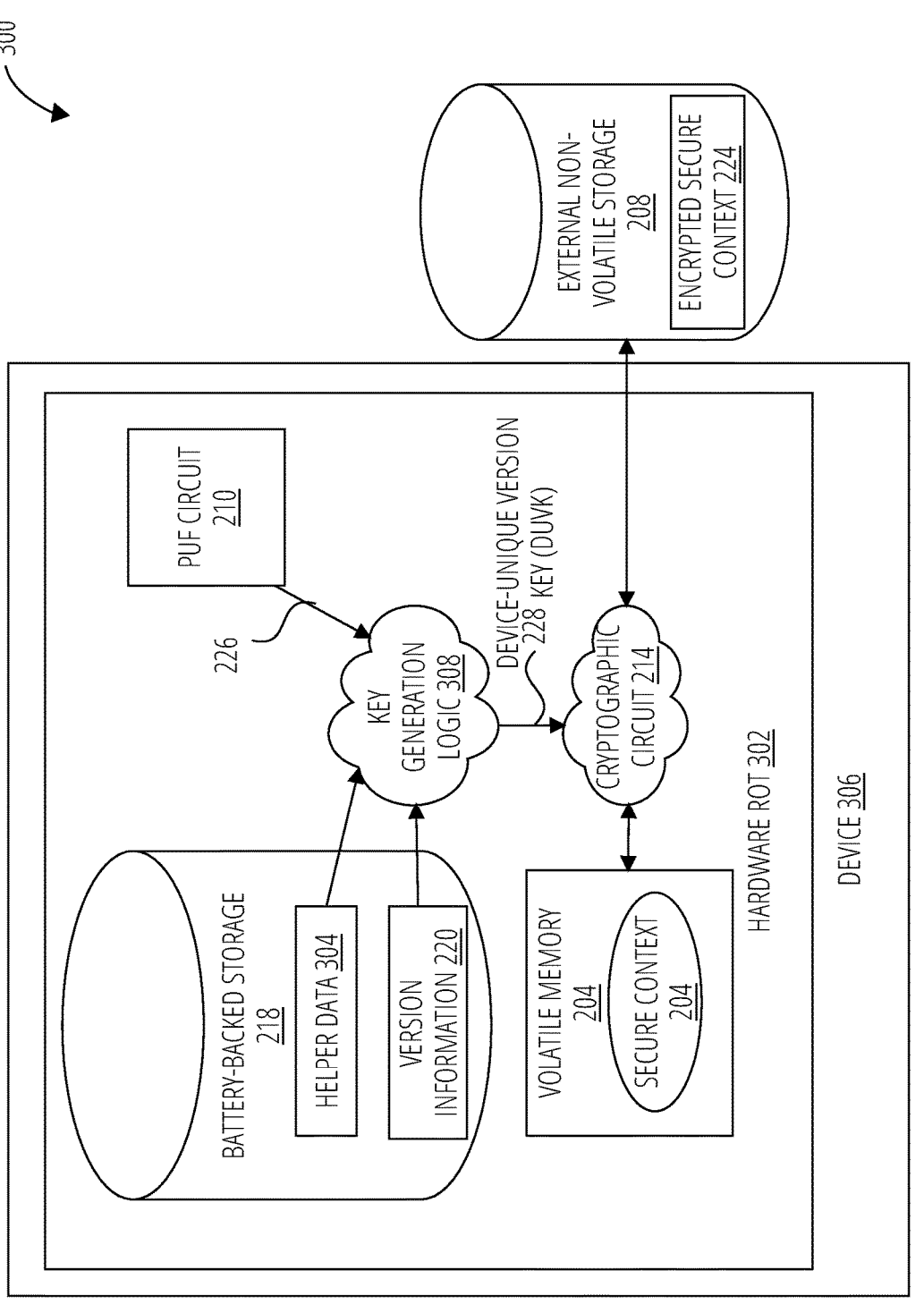
FIG. 3 is a block diagram of a computing system with a hardware ROT for protecting a secure context according to at least one embodiment.

In at least one embodiment, the key generation logic 212 can generate the device-unique version key 228 using PUF helper data 222, which is stored in off-chip storage, as illustrated in FIG. 2. In another embodiment, the key generation logic 212 can generate the device-unique version key 228 using PUF helper data stored in the battery-backed storage 218, as illustrated in FIG. 3. In other embodiments, the PUF helper data 222 can be stored in other locations. Alternatively, the key generation logic 212 can generate the device-unique version key 228 using first and second instances of the PUF helper data 222 as described herein.

FIG. 3 is a block diagram of a computing system 300 with a hardware ROT 302 for protecting secure context according to at least one embodiment. Like computing system 100 and computing system 200, the computing system 300 includes a device 306 with the hardware ROT 302 and the external non-volatile storage 208 coupled to the device 306. The hardware ROT 302 is similar to the hardware ROT 202, as noted by similar reference numbers, except the hardware ROT 302 includes key generation logic 308 that generates the device-unique version key 228 using the value 226, the version information 220, and helper data 304 stored in the battery-backed storage 218. In this embodiment, the key generation logic 212 can generate a device-unique version key 228 from three separate components, including a PUF challenge response, PUF helper data, and version information. As described above, a new device-unique version key 228 can be generated using modified version information 220, modified helper data 304, or both. The key generation logic 212 can receive the value 226 from the PUF circuit 210 and the helper data 304 and version information 220, which are stored in the battery-backed storage 218. The helper data 304 can be private information or public information.

FIG. 4 is a flow diagram of a method 400 of protecting a secure context in a hardware ROT according to at least one embodiment. The method 400 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 400 is performed by the device 106 of FIG. 1, device 206 of FIG. 2, or device 306 of FIG. 3. In another embodiment, the method 400 is performed by the hardware ROT 102 of FIG. 1, the hardware ROT 202 of FIG. 2, or the hardware ROT 302 of FIG. 3. Alternatively, other devices can perform the method 400.

Referring to FIG. 4, the method 400 begins with the processing logic generating a first key from a value, corresponding to a physical variation of the hardware ROT, and first helper data associated with the physical variation of the hardware ROT (block 402). At block 404, the processing logic receives a first encrypted secure context from off-chip storage. The processing logic decrypts the first encrypted secure context using the first key to obtain a secure context (block 406). At block 408, the processing logic generates a second key from the value and second helper data associated with the physical variation of the hardware ROT. The processing logic encrypts the secure context using the second key to obtain a second encrypted secure context (block 410). The processing logic stores the second encrypted secure context in the off-chip storage (block 412).

In at least one embodiment, the processing logic performs the receiving at block 404, the decrypting at block 406, the encrypting at block 410, and the storing at block 412 in response to a reset event of the hardware ROT. In at least one embodiment, the processing logic updates the secure context during execution after the decrypting the first encrypted secure context at block 406 and before the encrypting the secure context at block 410.

In a further embodiment, the physical variation of the hardware ROT is associated with an output of a PUF. The processing logic generates the first key using the output of the PUF and the first helper data. The processing logic generates the second key using the output of the PUF and second helper data.

In a further embodiment, the first helper data includes PUF helper data and first version information, and the second helper data includes the PUF helper data and second version information that is different than the first version information. In at least one embodiment, the processing logic generates the first key using the value, the PUF helper data, and the first version information. The processing logic generates the second key using the value, the PUF helper data, and the second version information.

In at least one embodiment, the first helper data includes first PUF helper data, and the second helper data includes second PUF helper data that is different than the first PUF helper data. The processing logic generates the first key using the value and the first PUF helper data. The processing logic generates the second key using the value and the second PUF helper data.

In at least one embodiment, the processing logic stores the secure context in the volatile memory of the hardware ROT and stores, at a first time, the first version information in battery-backed storage of the hardware ROT. The processing logic stores, at a second time after the first time, the second version information in the battery-backed storage. The first helper data can include the first version information, and the second helper data can include the second version information.

In at least one embodiment, the processing logic generates the first key using the value, PUF helper data, and first version information, where the first key is a first device-unique version key. The processing logic generates the second key using the value, the PUF helper data, and second version information, where the second key is a second device-unique version key.

In a further embodiment, the processing logic, in response to a reset event of the hardware ROT, re-generates the second key using the value, the PUF helper data, and the second version information. The processing logic receives the second encrypted secure context from the off-chip storage and decrypts the second encrypted secure context using the second key to recreate the secure context. The processing logic stores the secure context in the volatile memory. The processing logic can modify the secure context. For this, the processing logic generates a new key, such as a third device-unique version key, to encrypt the secure context before storing the secure context in the off-chip storage.

FIG. 5 is a flow diagram of a method 500 of protecting a secure context in a hardware ROT according to at least one embodiment. The method 500 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 500 is performed by the device 106 of FIG. 1, device 206 of FIG. 2, or device 306 of FIG. 3. In another embodiment, the method 500 is performed by the hardware ROT 102 of FIG. 1, the hardware ROT 202 of FIG. 2, or the hardware ROT 302 of FIG. 3. Alternatively, other devices can perform the method 500.

Referring to FIG. 5, the method 500 begins with the processing logic generating a first key from a value corresponding to a physical variation of the hardware ROT, helper data associated with the physical variation of the hardware ROT, and first version information. At block 504, the processing logic receives a first encrypted secure context from off-chip storage. The processing logic decrypts the first encrypted secure context using the first key to obtain a secure context (block 506). At block 508, the processing logic generates a second key from the value, the helper data, and second version information different from the first version information. The processing logic encrypts the secure context using the second key to obtain a second encrypted secure context (block 510). The processing logic stores the second encrypted secure context in the off-chip storage (block 512).

In at least one embodiment, the processing logic performs the receiving at block 504, the decrypting at block 506, the encrypting at block 510, and the storing at block 512 in response to a reset event of the hardware ROT. In at least one embodiment, the processing logic updates the secure context during execution after the decrypting the first encrypted secure context at block 506 and before the encrypting the secure context at block 510. In other embodiments, the various operations described above with respect to the method 400 of FIG. 4 can also be performed by the processing logic in connection with the method 500 of FIG. 4.

Figure 6:
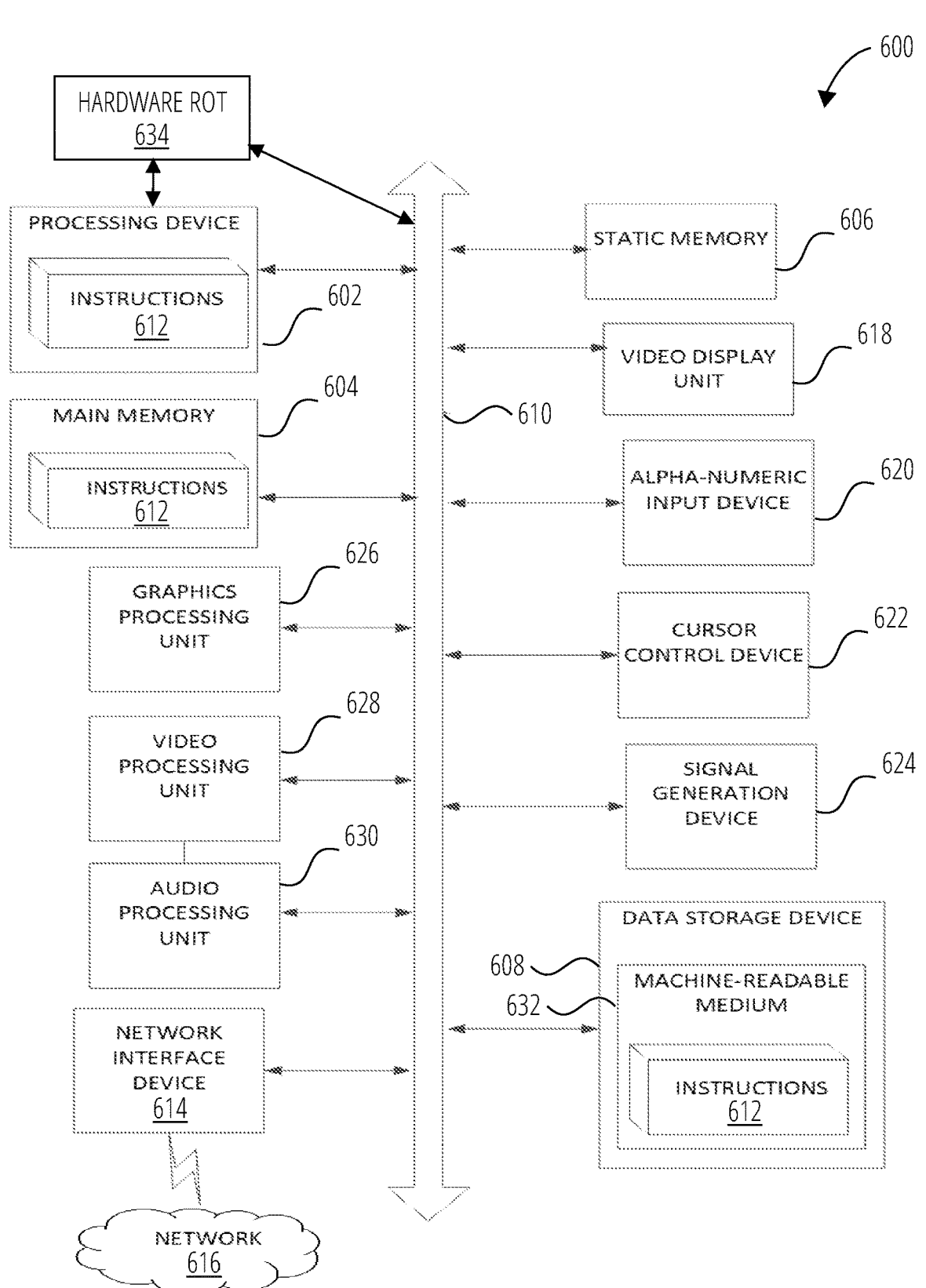
FIG. 6 illustrates an example of a computer system within which a set of instructions, for causing the machine to perform any one or more of the methodologies discussed herein, may be executed.

FIG. 6 illustrates an example of a computer system 600 within which a set of instructions, for causing the machine to perform any one or more of the methodologies discussed herein, may be executed. The computer system 600 includes a hardware ROT 634. In at least one embodiment, the hardware ROT 634 is any one of the hardware ROT described herein, such as hardware ROT 102 of FIG. 1, hardware ROT 202 of FIG. 3, or the hardware ROT 302 of FIG. 3. In alternative implementations, the machine may be connected (e.g., networked) to other machines in a local area network (LAN), an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 608, which communicate with each other via a bus 610.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices, such as an application-specific integrated circuit (ASIC), a field programmable gate array (FPGA), a digital signal processor (DSP), a network processor, or the like. The processing device 602 is configured to execute instructions 612 for performing the operations and steps discussed herein.

The computer system 600 may further include a network interface device 614 to communicate over the network 616. The computer system 600 also may include a video display unit 618 (e.g., a liquid crystal display (LCD) or a cathode ray tube (CRT)), an alpha-numeric input device 620 (e.g., a keyboard), a cursor control device 622 (e.g., a mouse), a signal generation device 624 (e.g., a speaker), a graphics processing unit 626, video processing unit 628, and audio processing unit 630.

The data storage device 608 may include a machine-readable storage medium 632 (also known as a computer-readable storage medium) on which is stored one or more sets of instructions 612 or software embodying any one or more of the methodologies or functions described herein. The instructions 612 may also reside, completely or at least partially, within the main memory 604 and/or within the processing device 602 during execution thereof by the computer system 600, the main memory 604 and the processing device 602 also constituting machine-readable storage media.

In one implementation, the instructions 612 include instructions to implement the functionality described herein. While the machine-readable storage medium 632 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

It is to be understood that the above description is intended to be illustrative and not restrictive. Many other implementations will be apparent to those of skill in the art upon reading and understanding the above description. Therefore, the disclosure scope should be determined with reference to the appended claims, along with the full scope of equivalents to which such claims are entitled.

In the above description, numerous details are set forth. It will be apparent, however, to one skilled in the art that the aspects of the present disclosure may be practiced without these specific details. In some instances, well-known structures and devices are shown in block diagram form rather than in detail to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to convey the substance of their work most effectively to others skilled in the art. An algorithm is here, and generally, conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

However, it should be borne in mind that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk, including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

What is claimed is:

1. A hardware root of trust (ROT) comprising:
key generation logic to generate a first key from a value corresponding to a physical variation of the hardware ROT, and first helper data associated with the physical variation of the hardware ROT, and to generate a second key from the value and second helper data associated with the physical variation of the hardware ROT; and
a cryptographic circuit to:
receive a first encrypted secure context from off-chip storage;

decrypt the first encrypted secure context using the first key to obtain a secure context;
encrypt the secure context using the second key to obtain a second encrypted secure context; and
store the second encrypted secure context in the off-chip storage.

2. The hardware ROT of claim 1, further comprising a physically unclonable function (PUF), wherein the value corresponding to the physical variation of the hardware ROT is associated with an output of the PUF, wherein the first key is further generated based on the output of the PUF and the first helper data, and wherein the second key is further generated based on the output of the PUF and the second helper data.

3. The hardware ROT of claim 1, wherein the first helper data comprises PUF helper data and first version information, and wherein the second helper data comprises the PUF helper data and second version information that is different from the first version information.

4. The hardware ROT of claim 1, wherein the first helper data comprises first PUF helper data, and wherein the second helper data comprises second PUF helper data that is different from the first PUF helper data.

5. The hardware ROT of claim 1, further comprising:
volatile memory to store the secure context; and
battery-backed storage to store first version information at a first time and second version information at a second time after the first time, wherein the first helper data comprises the first version information and the second helper data comprises the second version information.

6. The hardware ROT of claim 5, wherein the key generation logic is to generate the first key using the value, PUF helper data, and the first version information, wherein the first key is a first device-unique version key, and wherein the key generation logic is to generate the second key using the value, the PUF helper data, and the second version information, wherein the second key is a second device-unique version key.

7. The hardware ROT of claim 6, wherein, in response to a reset event of the hardware ROT:
the key generation logic is to re-generate the second key using the value, the PUF helper data, and the second version information, and
the cryptographic circuit is further to:
receive the second encrypted secure context from the off-chip storage;
decrypt the second encrypted secure context using the second key to recreate the secure context; and
store the secure context in the volatile memory.

8. The hardware ROT of claim 1, wherein the cryptographic circuit is to receive the first encrypted secure context, decrypt the first encrypted secure context, encrypt the secure context, and store the second encrypted secure context in response to a reset event of the hardware ROT.

9. The hardware ROT of claim 1, wherein the secure context is updated during execution after the first encrypted secure context is decrypted and before the secure context is encrypted.

10. A method of operating a hardware root of trust (ROT), the method comprising:
generating a first key from a value, corresponding to a physical variation of the hardware ROT, and first helper data associated with the physical variation of the hardware ROT;
receiving a first encrypted secure context from off-chip storage;

decrypting the first encrypted secure context using the first key to obtain a secure context;

generating a second key from the value and second helper data associated with the physical variation of the hardware ROT; and encrypting the secure context using the second key to obtain a second encrypted secure context; and storing the second encrypted secure context in the off-chip storage.

11. The method of claim 10, wherein the value corresponding to the physical variation of the hardware ROT is associated with an output of a physically unclonable function (PUF), wherein:

generating the first key comprises generating the first key using the output of the PUF and the first helper data; and generating the second key comprises generating the second key using the output of the PUF and the second helper data.

12. The method of claim 10, wherein the first helper data comprises PUF helper data and first version information, and wherein the second helper data comprises the PUF helper data and second version information that is different from the first version information, wherein:

generating the first key comprises generating the first key using the value, the PUF helper data, and the first version information; and generating the second key comprises generating the second key using the value, the PUF helper data, and the second version information.

13. The method of claim 10, wherein the first helper data comprises first PUF helper data, and wherein the second helper data comprises second PUF helper data that is different from the first PUF helper data, wherein:

generating the first key comprises generating the first key using the value and the first PUF helper data; and generating the second key comprises generating the second key using the value and the second PUF helper data.

14. The method of claim 10, further comprising:

storing the secure context in volatile memory of the hardware ROT; and storing, at a first time, first version information in battery-backed storage of the hardware ROT; and storing, at a second time after the first time, second version information in the battery-backed storage, wherein the first helper data comprises the first version information and the second helper data comprises the second version information.

15. The method of claim 10, wherein:

generating the first key comprises generating the first key using the value, PUF helper data, and first version information, the first key being a first device-unique version key; and generating the second key comprises generating the second key using the value, the PUF helper data, and second version information, wherein the second key is a second device-unique version key.

16. The method of claim 15, further comprising, in response to a reset event of the hardware ROT:

re-generating the second key using the value, the PUF helper data, and the second version information;

receiving the second encrypted secure context from the off-chip storage;

decrypting the second encrypted secure context using the second key to recreate the secure context; and storing the secure context in volatile memory of the hardware ROT.

17. The method of claim 15, wherein the receiving, the decrypting, the encrypting, and the storing are performed in response to a reset event of the hardware ROT.

18. The method of claim 15, further comprising updating the secure context during execution after the decrypting the first encrypted secure context and before the encrypting the secure context.

19. A computing system comprising:

a non-volatile storage device; and a hardware root of trust (ROT), wherein the hardware ROT comprises:

key generation logic to generate a first key from a value corresponding to a physical variation of the hardware ROT, and first helper data associated with the physical variation of the hardware ROT, and to generate a second key from the value and second helper data associated with the physical variation of the hardware ROT; and a cryptographic circuit to:

receive a first encrypted secure context from off-chip storage;

decrypt the first encrypted secure context using the first key to obtain a secure context;

encrypt the secure context using the second key to obtain a second encrypted secure context; and store the second encrypted secure context in the off-chip storage.

20. The computing system of claim 19, wherein the hardware ROT further comprises:

volatile memory to store the secure context; and battery-backed storage to store first version information at a first time and second version information at a second time after the first time, wherein the first helper data comprises the first version information and the second helper data comprises the second version information.

* * * * *